United States Patent
Yokoyama et al.

(10) Patent No.: US 9,287,582 B2
(45) Date of Patent: Mar. 15, 2016

(54) COMPOSITION FOR FORMING SOLID ELECTROLYTE LAYER, METHOD FOR FORMING SOLID ELECTROLYTE LAYER, SOLID ELECTROLYTE LAYER, AND LITHIUM ION SECONDARY BATTERY

(71) Applicant: SEIKO EPSON CORPORATION, Tokyo (JP)

(72) Inventors: Tomofumi Yokoyama, Kai (JP); Hirofumi Hokari, Chino (JP); Sukenori Ichikawa, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 554 days.

(21) Appl. No.: 13/673,608

(22) Filed: Nov. 9, 2012

(65) Prior Publication Data

US 2013/0122376 A1  May 16, 2013

(30) Foreign Application Priority Data

Nov. 15, 2011 (JP) ................................ 2011-249411

(51) Int. Cl.
*H01M 10/0562* (2010.01)
*H01M 10/0525* (2010.01)
*B82Y 30/00* (2011.01)

(52) U.S. Cl.
CPC ...... *H01M 10/0562* (2013.01); *H01M 10/0525* (2013.01); *B82Y 30/00* (2013.01); *H01M 2300/0071* (2013.01); *Y02E 60/122* (2013.01)

(58) Field of Classification Search
None
See application file for complete search history.

(56) References Cited

U.S. PATENT DOCUMENTS

| 8,697,294 B1 * | 4/2014 | Tsukamoto et al. | 429/332 |
| 2011/0045355 A1 | 2/2011 | Ichikawa | |
| 2011/0318650 A1 * | 12/2011 | Zhang et al. | 429/320 |

FOREIGN PATENT DOCUMENTS

| JP | A-2008-059843 | 3/2008 |
| JP | A-2011-065982 | 3/2011 |
| JP | A-2012-184138 | 9/2012 |

OTHER PUBLICATIONS

Ahn et al., "Characteristics of Amorphous Lithium Lanthanum Titanate Electrolyte Thin Films Grown by PLD for Use in Rechargeable Lithium Microbatteries," *Electrochemical and Solid-State Letters*, vol. 8, No. 2, pp. A75-A78, 2005.

Inaguma et al., "Lithium Ion Conductivity in a Perovskite Lanthanum Lithium Titanate Single Crystal," *Journal of the Ceramic Society of Japan*, vol. 105, No. 6, pp. 548-550, 1997.

\* cited by examiner

*Primary Examiner* — Patrick Ryan
*Assistant Examiner* — Carmen Lyles-Irving
(74) *Attorney, Agent, or Firm* — Oliff PLC

(57) ABSTRACT

A composition for forming a solid electrolyte layer for use in the formation of a solid electrolyte layer of a lithium ion secondary battery contains first particles made of a lanthanum titanate and second particles made of a lithium titanate. It is preferable that the first particles have an average particle size of 50 nm or more and 300 nm or less. It is preferable that the second particles have an average particle size of 10 nm or more and 50 nm or less.

6 Claims, 1 Drawing Sheet

COMPOSITION FOR FORMING SOLID ELECTROLYTE LAYER, METHOD FOR FORMING SOLID ELECTROLYTE LAYER, SOLID ELECTROLYTE LAYER, AND LITHIUM ION SECONDARY BATTERY

BACKGROUND

1. Technical Field

The present invention relates to a composition for forming a solid electrolyte layer, a method for forming a solid electrolyte layer, a solid electrolyte layer, and a lithium ion secondary battery.

2. Related Art

Lithium ion secondary batteries are lightweight and have high capacity. In addition, they also provide high voltage when a suitable active material or the like is used. Therefore, they have been widely applied as batteries for portable electronic devices, cameras, watches, electrical power tools, and hybrid cars, for example.

However, because of the high activity of lithium and the use of an organic electrolyte solution, the danger of ignition upon short circuit, for example, is concerned. Therefore, in the design of a lithium battery, the assurance of safety is a big issue.

As an attempt to use no electrolyte solution, a lithium ion battery using an inorganic solid electrolyte has been attracting attention (see, e.g., JP-A-2008-59843 (Patent Document 1)).

As inorganic solid electrolytes, amorphous oxides, amorphous sulfides, and the like have been found, but attention has been focused on crystalline oxides having high chemical and thermal stability, particularly lithium lanthanum titanates (LLT) having high lithium ion conductivity.

In order to obtain a solid electrolyte layer made of a lithium lanthanum titanate, generally, a bulk lithium lanthanum titanate obtained by the high-temperature, solid-phase synthesis of lithium carbonate, lanthanum oxide, titanium oxide, or the like is pulverized into a powder having a desired particle diameter, and the powder is pressed and sintered at a high temperature of a thousand and several hundreds of degrees Celsius for a long period of time (see, e.g., Patent Document 1). Thus, in the related art, the formation of a solid electrolyte layer made of a lithium lanthanum titanate includes a step of maintaining a high temperature for a long period of time.

SUMMARY

An advantage of some aspects of the invention is to provide a composition capable of efficiently forming a solid electrolyte layer through a sintering treatment at a relatively low temperature, to provide a method for forming a solid electrolyte layer capable of efficiently forming a solid electrolyte layer by a sintering treatment at a relatively low temperature, to provide a highly reliable solid electrolyte layer using the method, to provide a highly reliable lithium ion secondary battery including the solid electrolyte layer, etc.

An aspect of the invention is directed to a composition for forming a solid electrolyte layer for use in the formation of a solid electrolyte layer of a lithium ion secondary battery. The composition contains first particles containing an oxide of titanium and an oxide of a lanthanoid and second particles made of a lithium titanate.

As a result, it is possible to provide a composition (composition for forming a solid electrolyte layer) capable of efficiently forming a solid electrolyte layer through a sintering treatment at a relatively low temperature.

It is preferable that the first particles are made of a lanthanum titanate.

It is preferable that the first particles have an average particle size of 10 nm or more and 300 nm or less.

As a result, the solid-phase reaction between the first particles and the second particles can proceed more quickly, whereby a solid electrolyte layer can be formed particularly efficiently. At the same time, a solid electrolyte layer can be more easily and reliably made of a lithium lanthanum titanate having a cubic perovskite-type crystal structure, whereby the solid electrolyte layer can be reliably provided with particularly excellent lithium ion conductivity. In addition, the sintering temperature can be further reduced, so this is also advantageous in terms of energy saving.

It is preferable that the second particles have an average particle size of 10 nm or more and 50 nm or less.

As a result, the solid-phase reaction between the first particles and the second particles can proceed more quickly, whereby a solid electrolyte layer can be formed particularly efficiently. At the same time, a solid electrolyte layer can be more easily and reliably made of a lithium lanthanum titanate having a cubic perovskite-type crystal structure, whereby the solid electrolyte layer can be reliably provided with particularly excellent lithium ion conductivity. In addition, the sintering temperature can be further reduced, so this is also advantageous in terms of energy saving.

It is preferable that the lanthanum titanate has a perovskite-type crystal structure.

As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

It is preferable that the lithium titanate has a spinel-type crystal structure.

As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

It is preferable that the lanthanum titanate is $La_2Ti_2O_7$ and the lithium titanate is $Li_4Ti_5O_{12}$.

As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

It is preferable that when the content of the first particles in the composition for forming a solid electrolyte layer is $X_1$ [% by mass] and the content of the second particles in the composition for forming a solid electrolyte layer is $X_2$ [% by mass], the relation $2.46 \leq X_1/X_2 \leq 4.92$ is satisfied.

As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

It is preferable that the composition for forming a solid electrolyte layer does not contain a binder made of an organic compound.

In the related art, as compositions for solid electrolyte layers, those containing an organic substance as a binder have been widely used for the purpose of improving formability, etc. However, in such a case, carbon dioxide causing global warming is produced, which is undesirable for the global environment. In addition, voids are formed in the resulting solid electrolyte layer due to carbon dioxide, which is also undesirable in terms of improving the reliability of a lithium ion secondary battery. In contrast, the composition according to the aspect of the invention (composition for forming a solid electrolyte layer) can be provided with excellent formability even in the case where no organic substance is contained. Therefore, the problems mentioned above can be reliably prevented.

Another aspect of the invention is directed to a method for forming a solid electrolyte layer including sintering the composition for forming a solid electrolyte layer according to the aspect of the invention.

As a result, it is possible to provide a method for forming a solid electrolyte layer capable of efficiently forming a solid electrolyte layer by a sintering treatment at a relatively low temperature.

It is preferable that a sintering temperature in the sintering is 700° C. or more and 900° C. or less.

As a result, a solid electrolyte layer made of a lithium lanthanum titanate and having excellent lithium ion conductivity can be reliably formed while further reducing the amount of energy required for the formation of a solid electrolyte layer.

It is preferable that a sintering time in the sintering is 30 minutes or more and 250 minutes or less.

As a result, a solid electrolyte layer made of a lithium lanthanum titanate and having excellent lithium ion conductivity can be reliably formed while further reducing the amount of energy required for the formation of a solid electrolyte layer and particularly improving the efficiency of the formation of a solid electrolyte layer (productivity).

It is preferable that the sintering is performed in an ambient atmosphere.

As a result, the structure of an apparatus for the formation of a solid electrolyte layer can be simplified, and also the efficiency of the formation of a solid electrolyte layer (productivity) can be particularly improved.

Still another aspect of the invention is directed to a solid electrolyte layer formed using the method according to the aspect of the invention.

As a result, a highly reliable solid electrolyte layer can be provided.

Yet another aspect of the invention is directed to a lithium ion secondary battery including the solid electrolyte layer according to the aspect of the invention.

As a result, a highly reliable lithium ion secondary battery can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
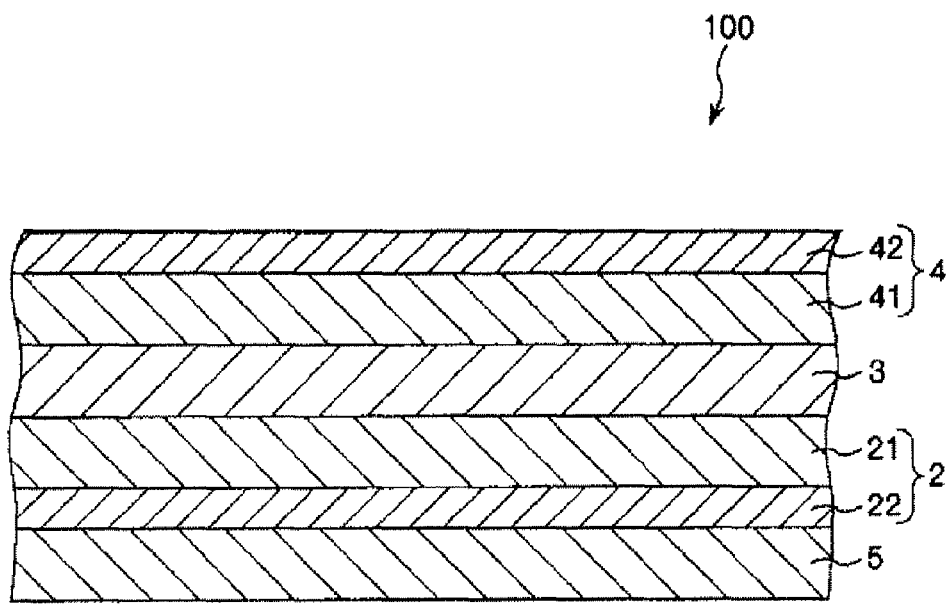
FIG. 1 is a cross-sectional view schematically showing a preferred embodiment of the lithium ion secondary battery of the invention.

Hereinafter, preferred embodiments of the invention will be described in detail.

Composition for Forming Solid Electrolyte Layer

First, a preferred embodiment of the composition for forming a solid electrolyte layer of the invention will be described in detail.

The composition for forming a solid electrolyte layer of the embodiment of the invention is for use in the formation of a solid electrolyte layer of a lithium ion secondary battery and contains first particles made of a lanthanum titanate and second particles made of a lithium titanate.

As a result, it is possible to provide a composition (composition for forming a solid electrolyte layer) capable of efficiently forming a solid electrolyte layer through a sintering treatment at a relatively low temperature (e.g., 900° C. or less). In addition, in the production of a lithium ion secondary battery, such a composition can be suitably formed into a composite material together with an active material, whereby the capacity of a lithium ion secondary battery can be further increased.

First Particles

As mentioned above, the first particles are made of a lanthanum titanate.

It is preferable that the lanthanum titanate forming the first particles has a perovskite-type crystal structure. As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

Examples of lanthanum titanates forming the first particles include $La_2Ti_2O_7$, $LaTiO_3$, $La_2Ti_2O_{6.5}$, $La_2Ti_3O_9$, $La_2Ti_4O_{11}$, and $La_2Ti_5O_{13}$, and $La_2Ti_2O_7$ is preferable. As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity. In particular, in the case where the lithium titanate forming the second particles is $Li_4Ti_5O_{12}$, it is preferable that the lanthanum titanate forming the first particles is $La_2Ti_2O_7$. As a result, advantages as mentioned above can be more prominently exerted.

Incidentally, it is necessary that the first particles are made mainly of a lanthanum titanate, and components other than the lanthanum titanate may also be contained in a predetermined proportion. In this case, the proportion of components other than the lanthanum titanate in the first particles is preferably 1.0% by mass or less, and more preferably 0.5% by mass or less. As a result, advantages as mentioned above can be sufficiently exerted. In addition, the lanthanum titanate may be doped with a metal element other than Ti and La.

The composition for forming a solid electrolyte layer contains a plurality of first particles. The average particle size of the first particles is preferably 10 nm or more and 300 nm or less, and more preferably 50 nm or more and 100 nm or less. As a result, the solid-phase reaction between the first particles and the second particles can proceed more quickly, whereby a solid electrolyte layer can be formed particularly efficiently. At the same time, a solid electrolyte layer can be more easily and reliably made of a lithium lanthanum titanate having a cubic perovskite-type crystal structure, whereby the solid electrolyte layer can be reliably provided with excellent lithium ion conductivity. In addition, the sintering temperature can be further reduced, so this is also advantageous in terms of energy saving. Incidentally, in the invention, the term "average particle size" refers to a number-average particle size. In addition, an average particle size (D50) can be determined using an apparatus such as a laser particle size distribution analyzer LA-920 (manufactured by HORIBA), Multisizer III (manufactured by Beckman Coulter), ELS-800 (manufactured by Otsuka Electronics), or a dynamic light scattering particle size/particle size distribution analyzer (manufactured by Nikkiso).

The content of the first particles in the composition for forming a solid electrolyte layer is preferably 65% by mass or more and 87% by mass or less, and more preferably 72% by mass or more and 84% by mass or less. As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

As the first particles, it is possible to use those obtained by pulverizing, thermal plasma spray, the glycothermal method, or the like, for example. However, in terms of low environmental burden, it is preferable that the first particles are synthesized by supercritical hydrothermal synthesis.

Second Particles

As mentioned above, the second particles are made of a lithium titanate.

It is preferable that the lithium titanate forming the second particles has a spinel-type crystal structure. A solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

Examples of lithium titanates forming the second particles include $Li_4Ti_5O_{12}$, $Li_2TiO_3$, $LiTi_2O_4$, and $Li_2Ti_3O_7$, and $Li_4Ti_5O_{12}$ is preferable. As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity. In particular, in the case where the lanthanum titanate forming the first particles is $La_2Ti_2O_7$, it is preferable that the lithium titanate forming the second particles is $Li_4Ti_5O_{12}$. As a result, advantages as mentioned above can be more prominently exerted.

Incidentally, it is necessary that the second particles are made mainly of a lithium titanate, and components other than the lithium titanate may also be contained in a predetermined proportion. In this case, it is preferable that the proportion of components other than the lithium titanate in the second particles is 1.0% by mass or less. As a result, advantages as mentioned above can be sufficiently exerted. In addition, the lithium titanate may be doped with a metal element other than Ti and Li.

The composition for forming a solid electrolyte layer contains a plurality of second particles. The average particle size of the second particles is preferably 10 nm or more and 50 nm or less, and more preferably 15 nm or more and 40 nm or less. As a result, the solid-phase reaction between the first particles and the second particles can proceed more quickly, whereby a solid electrolyte layer can be formed particularly efficiently. At the same time, a solid electrolyte layer can be more easily and reliably made of a lithium lanthanum titanate having a cubic perovskite-type crystal structure, whereby the solid electrolyte layer can be reliably provided with particularly excellent lithium ion conductivity. In addition, the sintering temperature can be further reduced, so this is also advantageous in terms of energy saving.

When the average particle size of the first particles is $D_1$ [nm] and the average particle size of the second particles is $D_2$ [nm], it is preferable that the relation $0.2 \leq D_1/D_2 \leq 13$ is satisfied, and it is more preferable that the relation $1.25 \leq D_1/D_2 \leq 5$ is satisfied. When such a relation is satisfied, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

The content of the second particles in the composition for forming a solid electrolyte layer is preferably 13% by mass or more and 35% by mass or less, and more preferably 16% by mass or more and 28% by mass or less. As a result, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

In addition, in the case where the lanthanum titanate forming the first particles is $La_2Ti_2O_7$ and the lithium titanate forming the second particles is $Li_4Ti_5O_{12}$, when the content of the first particles in the composition for forming a solid electrolyte layer is $X_1$ [% by mass] and the content of the second particles in the composition for forming a solid electrolyte layer is $X_2$ [% by mass], it is preferable that the relation $1.2 \leq X_1/X_2 \leq 6.4$ is satisfied, and it is more preferable that the relation $2.46 \leq X_1/X_2 \leq 4.92$ is satisfied. When such a relation is satisfied, a solid electrolyte layer formed using the composition for forming a solid electrolyte layer can be more easily and reliably made of a lithium lanthanum titanate having a cubic perovskite-type crystal structure, whereby the solid electrolyte layer can be reliably provided with particularly excellent lithium ion conductivity.

As the second particles, it is possible to use those obtained by pulverizing, thermal plasma spray, the glycothermal method, or the like, for example. However, in terms of low environmental burden, it is preferable that the second particles are synthesized by supercritical hydrothermal synthesis.

Additional Components

The composition for forming a solid electrolyte layer of the embodiment of the invention may contain components other than the first particles and the second particles (hereinafter referred to as "additional components"). In this case, the proportion of additional components in the composition for forming a solid electrolyte layer is preferably 5.0% by mass or less, and more preferably 3.0% by mass or less. As a result, advantages of the invention as mentioned above can be more prominently exerted.

Examples of additional components include third particles made of a material other than lanthanum titanates and lithium titanates, composite particles made of a material containing a lanthanum titanate and a lithium titanate, and a dispersion medium component that disperses the first particles and the second particles.

In addition, although the composition for forming a solid electrolyte layer of the embodiment of the invention may contain a binder made of an organic compound, it is preferable that such a binder is not contained. In the related art, as compositions for solid electrolyte layers, those containing an organic substance as a binder have been widely used for the purpose of improving formability, etc. However, in such a case, carbon dioxide causing global warming is produced, which is undesirable for the global environment. In addition, it may happen that voids are formed in the resulting solid electrolyte layer due to carbon dioxide or carbon remains therein, which is also undesirable in terms of improving the reliability of a lithium ion secondary battery. In contrast, the composition of the embodiment of the invention (composition for forming a solid electrolyte layer) can be provided with excellent formability even in the case where no organic substance is contained. Therefore, the problems as mentioned above can be reliably prevented.

Method for Forming Solid Electrolyte Layer

Next, a preferred embodiment of the method for forming a solid electrolyte layer of the embodiment of the invention will be described in detail.

The method for forming a solid electrolyte layer of the embodiment of the invention includes a sintering step of sintering the composition for forming a solid electrolyte layer of the embodiment of the invention mentioned above. As a result, it is possible to provide a method for forming a solid electrolyte layer capable of efficiently forming a solid electrolyte layer by a sintering treatment at a relatively low temperature.

In particular, the method for forming a solid electrolyte layer of this embodiment includes the following steps: (1a) a shaping step in which the composition for forming a solid electrolyte layer is formed into a desired shape by pressing and (1b) a sintering step in which the composition for forming a solid electrolyte layer formed into a desired shape is sintered.

Shaping Step

As mentioned above, this embodiment includes, prior to a sintering step, a shaping step in which the composition for forming a solid electrolyte layer is formed into a desired shape by pressing. When such a shaping step is included, a solid electrolyte layer having a desired shape can be more reliably formed. In the related art, a composition for forming a solid electrolyte layer generally has as a constituent an inorganic material having a high melting point, and it has been difficult to form such a composition into a desired shape simply by pressing unless a binder is contained. However, the composition for forming a solid electrolyte layer of the embodiment of the invention can be fused at a low temperature. Therefore, even when the composition for forming a solid electrolyte layer contains no binder, it can be reliably formed into a desired shape.

The pressure of pressing is preferably 125 MPa or more and 874 MPa or less, and more preferably 375 MPa or more and 624 MPa or less. As a result, a solid electrolyte layer having a desired shape can be even more reliably formed.

Incidentally, this step may also be such that the composition for forming a solid electrolyte layer is mixed with an electrode active material in at least part of a shaped body to be produced by pressing. As a result, the area of contact between the electrode active material and a solid electrolyte layer in the lithium ion secondary battery eventually obtained can be increased, whereby the amount of lithium ions involved in the battery reaction can be increased. Therefore, the capacity of a battery can be further increased.

Sintering Step

Subsequently, the composition for forming a solid electrolyte layer formed into a desired shape is sintered (sintering step).

The sintering temperature T in the sintering step is preferably 500° C. or more and 1200° C. or less, and more preferably 700° C. or more and 900° C. or less. As a result, a solid electrolyte layer made of a lithium lanthanum titanate and having excellent lithium ion conductivity can be reliably formed while further reducing the amount of energy required for the formation of a solid electrolyte layer.

Incidentally, in this step, in the case where the heating temperature (sintering temperature) is varied with time, the sintering temperature T mentioned above refers to the highest treatment temperature in this step.

The sintering time in the sintering step is preferably 30 minutes or more and 250 minutes or less, and more preferably 60 minutes or more and 180 minutes or less. As a result, a solid electrolyte layer made of a lithium lanthanum titanate and having excellent lithium ion conductivity can be reliably formed while further reducing the amount of energy required for the formation of a solid electrolyte layer and particularly improving the efficiency of the formation of a solid electrolyte layer (productivity).

Incidentally, in this step, in the case where the heating temperature (sintering temperature) is varied with time, when the highest treatment temperature in this step is T[° C.], the sintering time mentioned above refers to the holding time (integration time) at a temperature of $(T-300)°$ C. or more and T° C. or less in this step.

It is preferable that the sintering step is performed in an ambient atmosphere (in air). As a result, the structure of an apparatus for the formation of a solid electrolyte layer can be simplified, and also the efficiency of the formation of a solid electrolyte layer (productivity) can be particularly improved.

When the highest treatment temperature in this step is T[° C.], the temperature rise rate from $(T-300)°$ C. to $(T-10)°$ C. is preferably 2° C./min or more and 30° C./min or less, and more preferably 5° C./min or more and 20° C./min or less. As a result, the productivity of a solid electrolyte layer can be particularly improved while reliably preventing the occurrence of defects in the solid electrolyte layer due to a sudden temperature change.

Solid Electrolyte Layer

Next, the solid electrolyte layer of the embodiment of the invention will be described.

The solid electrolyte layer of the embodiment of the invention is formed using the method of the embodiment of the invention mentioned above. As a result, a highly reliable solid electrolyte layer can be provided.

The solid electrolyte layer formed using the composition for forming a solid electrolyte layer mentioned above is made of a lithium lanthanum titanate.

It is preferable that the lithium lanthanum titanate forming the solid electrolyte layer has a cubic perovskite-type crystal structure. As a result, the solid electrolyte layer can be provided with particularly excellent lithium ion conductivity.

In the invention, the solid electrolyte layer may have any shape. In addition, the solid electrolyte layer may contain an electrode active material.

Lithium Ion Secondary Battery

Next, the lithium ion secondary battery of the embodiment of the invention will be described.

The lithium ion secondary battery of the embodiment of the invention includes the solid electrolyte layer of the embodiment of the invention mentioned above. As a result, a highly reliable solid electrolyte layer can be provided.

It is necessary that the lithium ion secondary battery of the embodiment of the invention includes the solid electrolyte layer of the embodiment of the invention mentioned above. In other respects, the structure is not particularly limited and may be the same as in a known lithium ion secondary battery. Hereinafter, an example of the structure of the lithium ion secondary battery of the embodiment of the invention will be described.

FIG. 1 is a cross-sectional view schematically showing a preferred embodiment of the lithium ion secondary battery of the embodiment of the invention.

The lithium ion secondary battery 100 shown in FIG. 1 has a structure in which an insulating film 5, a positive electrode 2, a solid electrolyte layer 3, and a negative electrode 4 are laminated in this order.

The positive electrode 2 has a structure in which an active material layer (positive electrode active material layer) 21 provided on the solid-electrolyte-layer-3 side and a collector layer (positive electrode collector layer) 22 provided on the other side are laminated together.

The negative electrode 4 has a structure in which an active material layer (negative electrode active material layer) 41 provided on the solid-electrolyte-layer-3 side and a collector layer (negative electrode collector layer) 42 provided on the other side are laminated together.

Further, the surface of the laminate except for the surface of the insulating film 5 is covered with a protective film (not shown) having insulating properties.

The material forming the active material layer (positive electrode active material layer) 21 may be, for example, $LiMn_2O_4$, $LiMnO_2$, $LiCoO_2$, $LiCo_{1-x}Ni_xO_2$, $LiNiO_2$, or the like.

The material forming the collector layer (positive electrode collector layer) 22 may be, for example, an elemental metal selected from the group consisting of Cu, Mg, Ti, Fe, Co, Ni, Zn, Al, Ge, In, Au, Pt, Ag, and Pd, an alloy containing two or more kinds of elements selected from the above group, or the like.

The solid electrolyte layer 3 is formed using the composition for forming a solid electrolyte layer of the embodiment of the invention mentioned above.

The material forming the active material layer (negative electrode active material layer) 41 may be, for example, an oxide containing one or more kinds of elements selected from the group consisting of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, and Zn, etc.

Specific examples of materials for the active material layer (negative electrode active material layer) 41 include silicon-manganese alloy (Si—Mn), silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), Sn-doped indium oxide (ITO), Al-doped zinc oxide (AZO), Ga-doped zinc oxide (GZO), Sn-doped tin oxide (ATO), F (fluorine)-doped tin oxide (FTO), carbon materials, and substances having lithium ions inserted between carbon material layers.

The material forming the collector layer (negative electrode collector layer) 42 may be an elemental metal selected from the group consisting of Cu, Mg, Ti, Fe, Co, Ni, Zn, Al, Ge, In, Au, Pt, Ag, and Pd, an alloy containing two or more kinds of elements selected from the above group, or the like.

The material forming the insulating film 5 may be an oxide, a nitride, or a sulfide of one or more kinds of elements selected from the group consisting of Si, Cr, Zr, Al, Ta, Ti, Mn, Mg, and Zn, etc. Specific examples of materials for the insulating film 5 include $Si_34$, $SiO_2$, $Cr_2O_3$, $ZrO_2$, $Al_2O_3$, $TaO_2$, $TiO_2$, $Mn_2O_3$, MgO, and ZnS.

Preferred embodiments of the invention have been described above. However, the invention is not limited thereto.

For example, in the above embodiment, the case where the method for forming a solid electrolyte layer of the invention includes, prior to a sintering step, a shaping step in which the composition for forming a solid electrolyte layer is formed into a desired shape by pressing has been described as a typical example. However, it is necessary that the method of the invention includes a sintering step, and it is possible that a shaping step in which pressing is performed is not included.

In addition, the method of the invention may also include additional steps other than the steps mentioned above.

In addition, in the above embodiment, the case where a solid electrolyte layer, a constituent member of a lithium ion secondary battery, is independently formed has been mainly described. However, in the method for forming a solid electrolyte layer of the embodiment of the invention, it is also possible that in a sintering step, a solid electrolyte layer is formed and also other constituents of a lithium ion secondary battery (e.g., electrodes, etc.) are formed. For example, it is possible that a laminate including a layer of the composition for forming a solid electrolyte layer, a layer of a composition for forming a positive electrode, and a layer of a composition for forming a negative electrode is formed, and the laminate is then subjected to a sintering treatment, thereby producing a lithium ion secondary battery.

EXAMPLES

Hereinafter, the invention will be described in further detail with reference to examples. However, the invention is not limited to these examples. A wide variety of applications are possible without departing from the gist of the invention.

1. Production of Composition for Forming Solid Electrolyte Layer

Example 1

First particles made of $La_2Ti_2O_7$ having an average particle size of 200 nm were obtained by supercritical hydrothermal synthesis. Incidentally, $La_2Ti_2O_7$ had a layered perovskite-type crystal structure. In addition, the content of components other than $La_2Ti_2O_7$ contained in the first particles was 0.1% by mass or less.

Second particles made of $Li_4Ti_5O_{12}$ having an average particle size of 20 nm were obtained by supercritical hydrothermal synthesis. Incidentally, $Li_4Ti_5O_{12}$ had a spinel-type crystal structure. In addition, the content of components other than $Li_4Ti_5O_{12}$ contained in the second particles was 0.1% by mass or less.

The first particles and the second particles were mixed in a molar ratio of 3:1 to give a composition for forming a solid electrolyte layer.

The atomic composition ratio of the composition for forming a solid electrolyte layer was determined by ICP analysis. As a result, the molar ratio Li:La:Ti was 0.28:0.45:1.0.

Examples 2 to 7

Compositions for forming a solid electrolyte layer were produced in the same manner as in Example 1, except that the structure of the first particles, the structure of the second particles, and the mixing ratio between the first particles and the second particles were as shown in Table 1.

Comparative Example 1

A $Li_2CO_3$ powder, a $La_2O_3$ powder, and a $TiO_2$ powder were mixed in a molar ratio of 1:1:4 to give a powder mixture.

Incidentally, as the $Li_2CO_3$ powder, a powder in which the content of components other than $Li_2CO_3$ was 0.001% by mass or less was used. As the $La_2O_3$ powder, a powder in which the content of components other than $La_2O_3$ was 0.01% by mass or less was used. As the $TiO_2$ powder, a powder in which the content of components other than $TiO_2$ was 0.1 mass % or less was used.

Next, an acetone solvent was added to the powder mixture and mixed for 2 hours in a planetary ball mill, followed by drying.

subsequently, a heat treatment was performed at 800° C.×4 hours in order to remove adsorbed $CO_2$, thereby giving a composition for forming a solid electrolyte layer.

Table 1 summarizes the structures of the compositions for forming a solid electrolyte layer of the examples and the comparative example. Incidentally, the column for average particle size shows a number-average particle size measured using a dynamic light scattering particle size/particle size distribution analyzer UPA-EX250 (manufactured by Nikkiso). In addition, in the column for crystal structure, a perovskite-type crystal structure is designated as "P", a spinel-type crystal structure is designated as "S", and other crystal structures are designated as "Z". In addition, with respect to Comparative Example 1, the conditions of the $Li_2CO_3$ powder are shown in the column for first particles, the conditions of the $La_2O_3$ powder are shown in the column for second particles, and the conditions of the $TiO_2$ powder are shown in the column for third particles.

TABLE 1

| | First Particles | | | | Second Particles | | | | Third Particles | | | |
|---|---|---|---|---|---|---|---|---|---|---|---|---|
| | Composition | Crystal Structure | Average Particle Size [nm] | Content [% by pass] | Composition | Crystal Structure | Average Particle Size [nm] | Content [% by pass] | Composition | Crystal Structure | Average Particle Size [nm] | Content [% by pass] |
| Example 1 | $La_2Ti_2O_7$ | P | 200 | 75.9 | $La_4Ti_5O_{12}$ | S | 20 | 24.1 | — | — | — | — |
| Example 2 | $La_2Ti_2O_7$ | P | 50 | 75.9 | $La_4Ti_5O_{12}$ | S | 50 | 24.1 | — | — | — | — |
| Example 3 | $La_2Ti_2O_7$ | P | 900 | 75.9 | $La_4Ti_5O_{12}$ | S | 100 | 24.1 | — | — | — | — |
| Example 4 | $La_2Ti_2O_7$ | P | 200 | 69.0 | $La_4Ti_5O_{12}$ | S | 20 | 31.0 | — | — | — | — |
| Example 5 | $La_2Ti_2O_7$ | P | 200 | 71.1 | $La_4Ti_5O_{12}$ | S | 20 | 28.9 | — | — | — | — |
| Example 6 | $La_2Ti_2O_7$ | P | 200 | 83.1 | $La_4Ti_5O_{12}$ | S | 20 | 16.9 | — | — | — | — |
| Example 7 | $La_2Ti_2O_7$ | P | 200 | 84.6 | $La_4Ti_5O_{12}$ | S | 20 | 15.4 | — | — | — | — |
| Comparative Example 1 | $Li_2CO_3$ | Z | 500 | 9.1 | $La_2O_3$ | Z | 200 | 62.6 | $TiO_2$ | Z | 500 | 28.3 |

2. Sintering of Composition for Forming Solid Electrolyte Layer 2.1. Sintering Under First Conditions The compositions for forming a solid electrolyte layer of the examples and the comparative example were each placed in a die with an inner diameter of 10.00 mm and pressed for 10 minutes at a pressure of 624 MPa to give a shaped body (shaping step).

The shaped body was placed in a crucible made of alumina and subjected to a sintering treatment at 900° C.×1 hour using an electric furnace (sintering step). The temperature rise rate was 10° C./min. The sintered body was then allowed to cool to room temperature.

2.2. Sintering Under Second Conditions

The compositions for forming a solid electrolyte layer of the examples and the comparative example were each subjected to a heat treatment (heat treatment A) at 1150° C.×12 hours.

Subsequently, the sample subjected to the heat treatment A was pulverized, shaped by cold isostatic pressing (GIP) at 1 MPa, and then subjected to a sintering treatment at 1350° C.×6 hours (heat treatment B).

3. Evaluation 3.1. X-Ray Diffraction

The treated products of the examples and the comparative example obtained by sintering under the first conditions and sintering under the second conditions were each pulverized in an agate mortar, applied onto a Si substrate, and subjected to measurement using an X-ray diffractometer (manufactured by PANalytical, X'Pert Pro). For comparison, a shaped body formed without a sintering treatment was pulverized and subjected to measurement.

Charts before and after the sintering treatment were compared. In a chart after sintering, when a lithium lanthanum titanate peak was observed, the result was rated as "good", while when a lithium lanthanum titanate peak was not observed, the result was rated as "poor".

3.2. Lithium Ion Conductivity

The treated products of the examples and the comparative example obtained by sintering under the first conditions and sintering under the second conditions were each subjected to the measurement of lithium ion conductivity using an electrochemical impedance analyzer PGSTAT302 manufactured by Autolab and evaluated according to the following criteria. For comparison, a shaped body formed without a sintering treatment was also subjected to measurement/evaluation.

A: Lithium ion conductivity is $1 \times 10^{-4}$ S/cm or more.

B: Lithium ion conductivity is $5 \times 10^{-5}$ S/cm or more and less than $1 \times 10^{-4}$ S/cm.

C: Lithium ion conductivity is $1 \times 10^{-6}$ S/cm or more and less than $5 \times 10^{-5}$ S/cm.

D: Lithium ion conductivity is $5 \times 10^{-7}$ S/cm or more and less than $1 \times 10^{-6}$ S/cm.

E: Lithium ion conductivity is less than $5 \times 10^{-7}$ S/cm.

The results are shown in Table 2.

TABLE 2

| | X-Ray Diffraction | | | Lithium Ion Conductivity | | |
|---|---|---|---|---|---|---|
| | Before Sintering | First Conditions | Second Conditions | Before Sintering | First Conditions | Second Conditions |
| Example 1 | Poor | Good | Good | E | A | A |
| Example 2 | Poor | Good | Good | E | A | A |
| Example 3 | Poor | Good | Good | E | D | B |
| Example 4 | Poor | Good | Good | E | B | B |
| Example 5 | Poor | Good | Good | E | A | A |

TABLE 2-continued

| | X-Ray Diffraction | | | Lithium Ion Conductivity | | |
|---|---|---|---|---|---|---|
| | Before Sintering | First Conditions | Second Conditions | Before Sintering | First Conditions | Second Conditions |
| Example 6 | Poor | Good | Good | E | A | A |
| Example 7 | Poor | Good | Good | E | C | B |
| Comparative Example 1 | Poor | Poor | Good | E | E | A |

Figure 2:
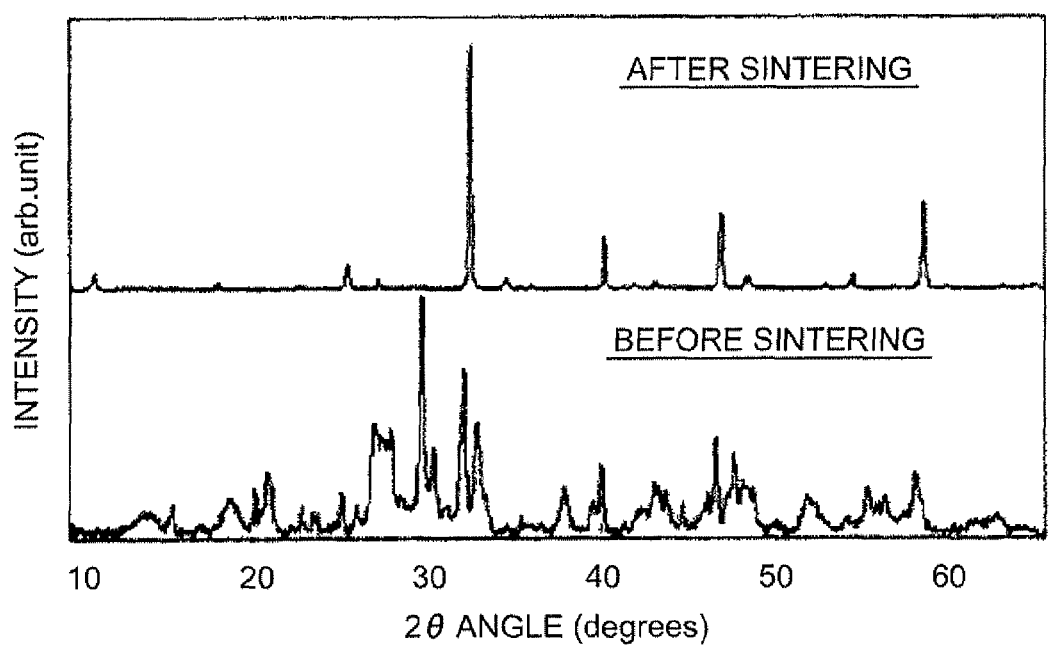
FIG. 2 shows X-ray diffraction charts about Example 1 before and after the sintering treatment (first conditions).

As is clear from Table 2, excellent results were obtained in the examples according to the invention. Meanwhile, no satisfactory results were obtained from the comparative example. That is, in the comparative example, an electrolyte layer made of a lithium lanthanum titanate was not formed by the sintering treatment at a relatively low temperature. In contrast, in the invention, electrolyte layers made of a lithium lanthanum titanate were suitably formed by the sintering treatment at a relatively low temperature. In particular, in Examples 1 to 7, the sintered bodies obtained by the sintering treatment were each made of a lithium lanthanum titanate having a cubic perovskite-type crystal structure. In addition, in the invention, solid electrolyte layers having high lithium ion conductivity were formed, while in the comparative example, it was not possible to achieve sufficiently high lithium ion conductivity. Incidentally, FIG. 2 shows X-ray diffraction charts about Example 1 before and after the sintering treatment (first conditions).

In addition, sintering was performed in the same manner as above, except that the sintering temperature was changed within a range of 700° C. or more and 900° C. or less and the sintering time was changed within a range of 30 minutes or more and 180 minutes or less, followed by the above evaluation. As a result, the same results as above were obtained.

The entire disclosure of Japanese Patent Application No. 2011-249411, filed Nov. 15, 2011 is expressly incorporated by reference herein.

What is claimed is:

1. A method for making a solid electrolyte layer, comprising sintering a composition for forming a solid electrolyte layer, the composition for forming a solid electrolyte layer comprising:
   first particles containing oxide of titanium and oxide of a lanthanoid, the first particles being of $La_2Ti_2O_2$; and
   second particles being made of lithium titanate.

2. The method for making a solid electrolyte layer according to claim 1, a sintering temperature of the sintering being 700° C. or more and 900° C. or less.

3. The method for making a solid electrolyte layer according to claim 1, a sintering time of the sintering being 30 minutes or more and 250 minutes or less.

4. The method for making a solid electrolyte layer according to claim 1, the sintering being performed under an ambient atmosphere.

5. A solid electrolyte layer obtained by the method according to claim 1.

6. A lithium ion secondary battery comprising the solid electrolyte layer according to claim 5.

* * * * *